Dec. 13, 1938.　　　　　E. C. MILLS　　　　　2,139,969
PROCESS FOR CONVERTING GASEOUS HYDROCARBONS INTO LIQUID HYDROCARBONS
Filed Feb. 12, 1937
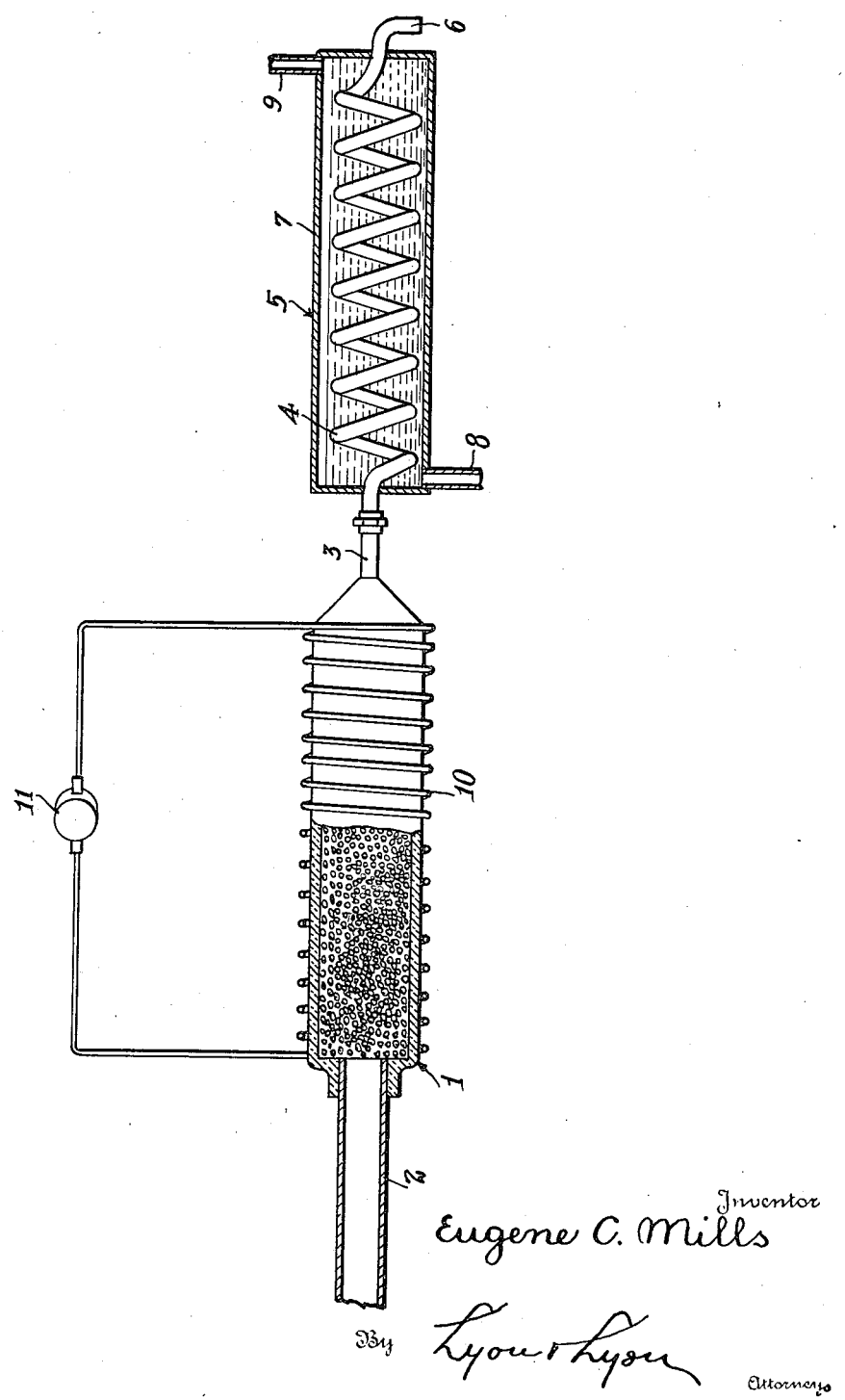
Eugene C. Mills, Inventor
By Lyon & Lyon, Attorneys Patented Dec. 13, 1938

2,139,969

UNITED STATES PATENT OFFICE 2,139,969

PROCESS FOR CONVERTING GASEOUS HYDROCARBONS INTO LIQUID HYDROCARBONS

Eugene C. Mills, Berkeley, Calif.

Application February 12, 1937, Serial No. 125,447

6 Claims. (Cl. 204—31)

My invention relates to processes for dehydrogenating light hydrocarbons and thereby converting them into heavier hydrocarbons.

More specifically, it is applicable to the conversion of gaseous hydrocarbons, such as methane, into liquid hydrocarbons suitable for motor fuel and other uses.

This application is in part a continuation of my application Serial No. 843 filed January 8, 1935.

An object of my invention is to provide a simple and inexpensive process for dehydrogenating light hydrocarbons and converting them into heavier hydrocarbons.

Essentially, my process comprises passing the light hydrocarbon to be dehydrogenated over a suitable catalyst in the presence of carbon at high temperature, while maintaining a high frequency current in the catalyst and carbonaceous material, and condensing the resultant product. As the carbonaceous material and catalyst, I prefer to employ granulated coke impregnated with cuprous chloride and I prefer to induce the high frequency current in the coke by positioning it in a high frequency magnetic field.

The single figure of the drawing discloses an apparatus suitable for practicing my process.

There is shown in the drawing a still or retort 1 of tubular shape having an inlet pipe 2 at one end and an outlet pipe 3 at the other end.

The outlet pipe connects with the inlet end of the worm 4 of a condenser 5 and the outlet end of the worm terminates in a discharge spout 6. A casing 7 surrounds the worm 4 through which water is circulated by means of inlet and outlet pipes 8 and 9, respectively.

The retort 1 is made of heat resistant electrically nonconducting material, such as silica, or other vitreous material and is surrounded by a coil conductor 10, the terminals of which are connected to a source of high frequency alternating current 11. In the drawing the source 11 is indicated as a mechanical generator but it is to be understood that any suitable source may be employed that is capable of providing the requisite amount of power at a suitable high frequency. The conductor 10 may consist of copper tubing in accordance with the accepted practice in high frequency work.

The retort 1 is preferably completely filled with the carbonaceous material to be employed. This material is preferably ordinary coke, although activated carbon, graphite or other forms of carbon may be used provided it is a conductor of electricity. The carbonaceous material is preferably formed in relatively small pieces to permit free passage of gas therethrough. Pieces ¼ inch in diameter have been found suitable.

The coke or other material is preferably impregnated with a metallic salt constituting a catalyst. I prefer to provide cuprous chloride as the catalyst, although ferrous chloride and nickel chloride, among others, may be used.

Where coke and cuprous chloride are employed, I prefer to soak the coke in a highly concentrated solution of cuprous chloride and then dry the coke in an oven at a temperature just high enough to drive off the water content.

In operation, when high frequency current is supplied to the conductor 10 from the source 11, a high frequency magnetic field is set up within the retort 1, which field induces currents in the carbonaceous material within the retort, which currents heat the material to a suitable temperature which may vary from approximately 350° C. to 1000° C., temperatures within the range 500° C. to 800° C. producing optimum results in my experimental work. After the coke has been fully heated, the gas to be treated, such as natural gas or methane, is introduced through the pipe 2 and flows through the retort 1 and through the pipe 3 into the worm 4 of the still 1, where condensible liquid products are condensed and discharged from the spout 6. As a result of the action of the heated coke and catalyst and the action of the high frequency magnetic field and the high frequency currents induced thereby, a substantial portion of the gaseous hydrocarbon constituents entering the retort 1 are dehydrogenated to produce heavier hydrocarbons and hydrogen. The heavier hydrocarbons are condensed to liquid form in the worm 4 and discharged as liquid from the spout 6. The hydrogen escapes from the spout 6 in gaseous form.

In my experimental work I have obtained good results using energizing current of a frequency of about 10,000 cycles per second, but the frequency does not appear to be critical and the exact frequency for greatest efficiency with any particular apparatus can be determined by test. My experiments indicate that the optimum frequency in commercial operation would probably be not less than 5000 cycles per second or more than 20,000 cycles per second.

The temperature of the carbonaceous material may be maintained at a suitable value by regulation of the current in the coil 10 since the necessary heat is produced by the flow of the current induced in the carbonaceous material by the electromagnetic field developed by the current flowing in the coil 10. Varying the current in the coil 10 naturally varies the strength of the electromagnetic field which determines the magnitudes of the currents induced in the carbonaceous material. I prefer to avoid arcs between the lumps of carbonaceous material and to this end the material is preferably tightly packed so that there is good electrical contact between the different particles. The reaction desired appears to be brought about solely by the action of the high frequency electromagnetic field acting on the gas at the elevated temperature in the presence of the catalyst.

It is also essential that the catalyst employed on the surfaces of the carbonaceous particles shall be an electric conductor as otherwise the catalyst would prevent the formation of the secondary currents in the carbonaceous material. Arcs between the carbonaceous particles are objectionable because they would tend to break down, by their high temperature, the very compounds that it is desired to obtain.

Although the invention has been explained by describing a particular specific procedure that may be employed and specific apparatus that may be used, it is to be understood that other apparatus than that disclosed may be used, and variations in the particular procedure described can be made without departing from the invention, the scope of which is set forth in the appended claims.

I claim:

1. The process of converting gaseous hydrocarbons into liquid hydrocarbons which comprises subjecting the gaseous hydrocarbons to the action of a high frequency magnetic field in the presence of solid carbonaceous material and a catalyst of the class consisting of cuprous chloride, ferrous chloride and nickel chloride, at an elevated temperature, the high frequency magnetic field in conjunction with the catalyst at the elevated temperature causing the reaction to take place.

2. The process of converting gaseous hydrocarbons into liquid hydrocarbons which comprises passing the gaseous hydrocarbon through a mass of granular carbonaceous material impregnated with a catalyst of the class consisting of cuprous chloride, ferrous chloride and nickel chloride, positioned in a high frequency magnetic field of such intensity as to heat said carbonaceous material to a temperature between 350° C. and 1000° C. by current induced therein by said magnetic field, and condensing the resultant products to liquefy the liquid hydrocarbons produced, the high frequency magnetic field in conjunction with the catalyst at the elevated temperature causing the reaction to take place.

3. The process of converting gaseous hydrocarbons into liquid hydrocarbons which comprises subjecting said gaseous hydrocarbons to a solid absorbent material, and a catalyst of the class consisting of cuprous chloride, ferrous chloride and nickel chloride at about a dull red heat, and simultaneously inducing a high frequency current in the solid absorbent material, the high frequency induced current in conjunction with the catalyst at the elevated temperature causing the reaction to take place.

4. The process of converting gaseous hydrocarbons into liquid hydrocarbons which comprises subjecting said gaseous hydrocarbon to a solid absorbent material, and cuprous chloride at about a dull red heat, and simultaneously inducing a high frequency current in the solid absorbent material, the high frequency induced current in conjunction with the catalyst at the elevated temperature causing the reaction to take place.

5. The process of converting gaseous hydrocarbons into liquid hydrocarbons which comprises subjecting said gaseous hydrocarbon to a solid absorbent material, and ferrous chloride at about a dull red heat, and simultaneously inducing a high frequency current in the solid absorbent material, the high frequency induced current in conjunction with the catalyst at the elevated temperature causing the reaction to take place.

6. The process of converting gaseous hydrocarbons into liquid hydrocarbons which comprises subjecting said gaseous hydrocarbon to a solid absorbent material, and nickel chloride at about a dull red heat, and simultaneously inducing a high frequency current in the solid absorbent material, the high frequency induced current in conjunction with the catalyst at the elevated temperature causing the reaction to take place.

EUGENE C. MILLS.